United States Patent [19]

Kosaka

[11] 4,322,755
[45] Mar. 30, 1982

[54] SYSTEM FOR REPRODUCING VIDEO SIGNALS IN SLOW-MOTION MODE

[75] Inventor: Yositeru Kosaka, Kamakura, Japan

[73] Assignee: Victor Company of Japan, Ltd., Yokohama, Japan

[21] Appl. No.: 83,325

[22] Filed: Oct. 10, 1979

[30] Foreign Application Priority Data

Oct. 16, 1978 [JP] Japan .................. 53-126150

[51] Int. Cl.³ .................. H04N 5/78; G11B 21/04; G11B 15/48
[52] U.S. Cl. .................. 360/10; 360/70; 360/74.4
[58] Field of Search .................. 360/10, 14, 73, 74.1, 360/74.4, 75, 84

[56] References Cited

U.S. PATENT DOCUMENTS

| | | | |
|---|---|---|---|
| 3,729,583 | 4/1973 | Yano | 360/75 |
| 3,869,709 | 3/1975 | Yamagishi et al. | 360/14 X |
| 3,934,269 | 1/1976 | Fujita et al. | 360/75 X |
| 3,968,518 | 7/1976 | Kihara et al. | 360/14 X |
| 4,021,857 | 5/1977 | Tanimura | 360/10 X |
| 4,190,869 | 2/1980 | Ota | 360/73 X |
| 4,246,616 | 1/1981 | Hiraguri et al. | 360/74.4 X |

Primary Examiner—Aristotelis M. Psitos
Attorney, Agent, or Firm—Louis Bernat

[57] ABSTRACT

A system for reproducing a video signal in a slow-motion reproduction comprises at least one rotary head for reproducing and operating to trace a tape on which has been recorded a video signal along tracks extending obliquely to the longitudinal direction of the tape thereby to pick up or reproduce the recorded video signal from the track, a circuit for intermittently driving a capstan motor for rotating a capstan for driving the tape thereby to shift the tape and to stop the tape intermittently in a slow-motion reproducing mode, and a circuit for controlling rotation of said rotary head so that the relative tracing speed of the rotary head relative to said tape becomes the same both at the time of intermittent tape travel and at the time of intermittent tape stoppage in the slow-motion reproducing mode.

5 Claims, 22 Drawing Figures

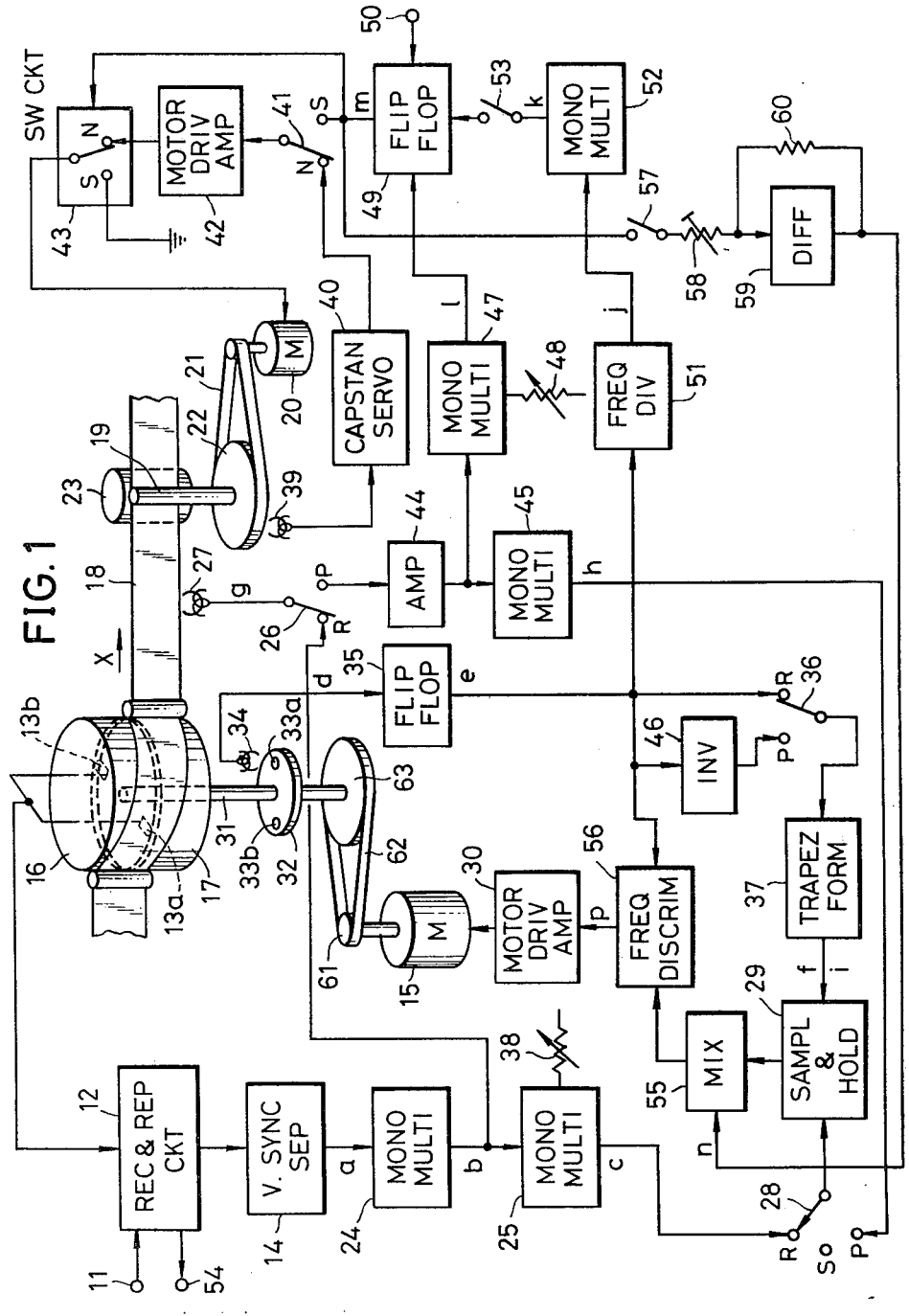

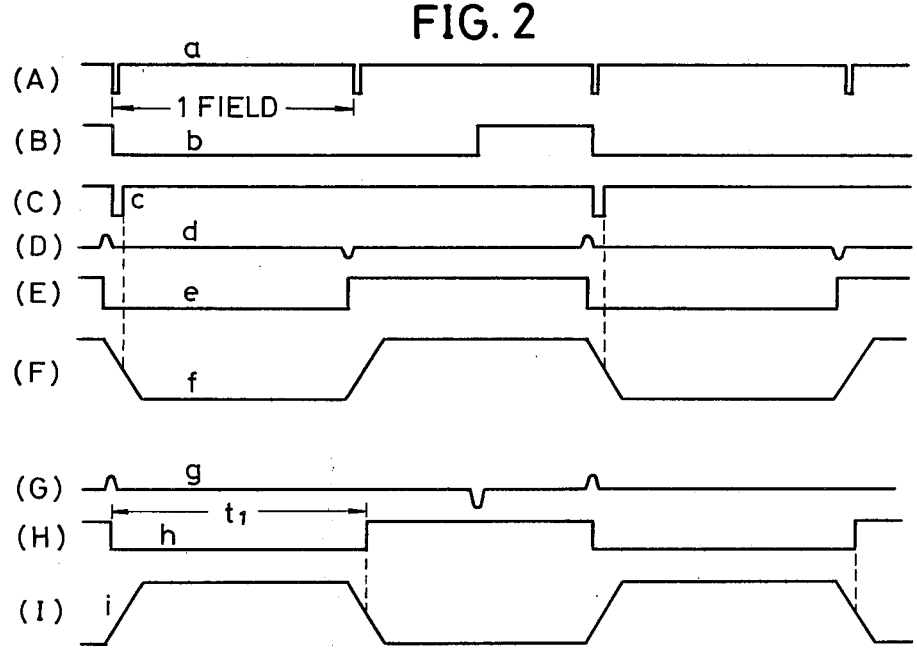
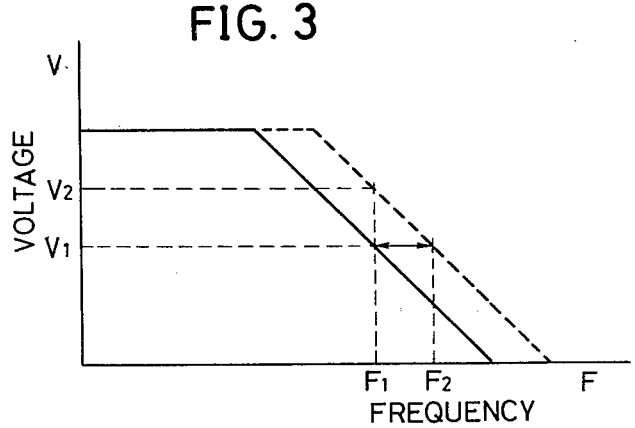

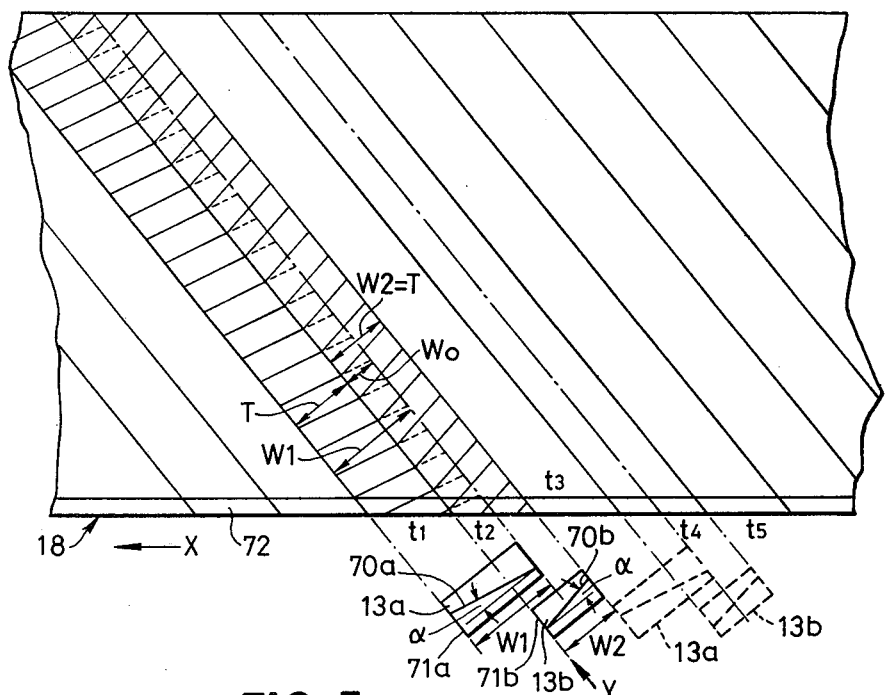
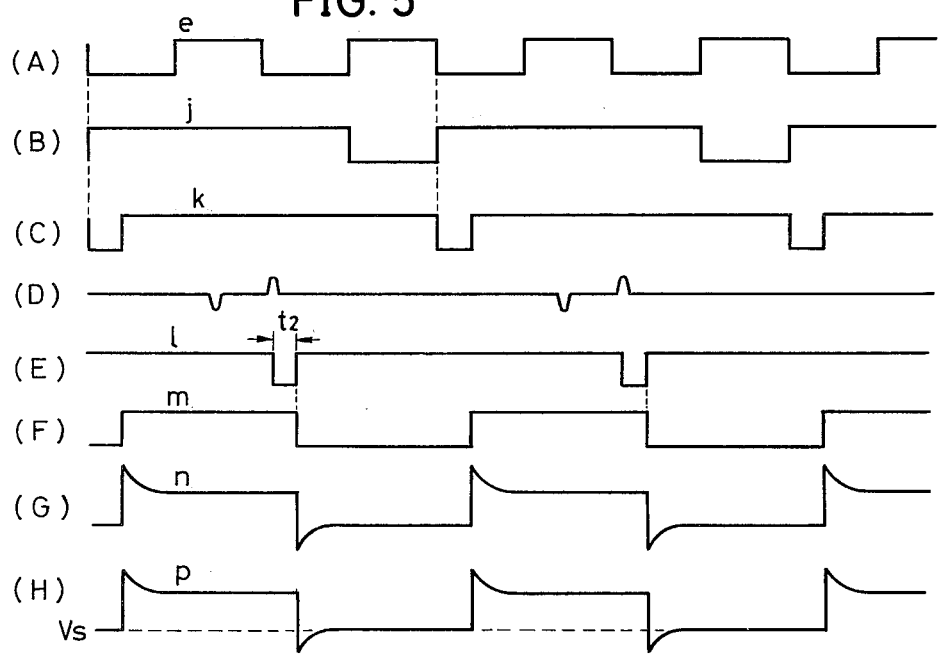

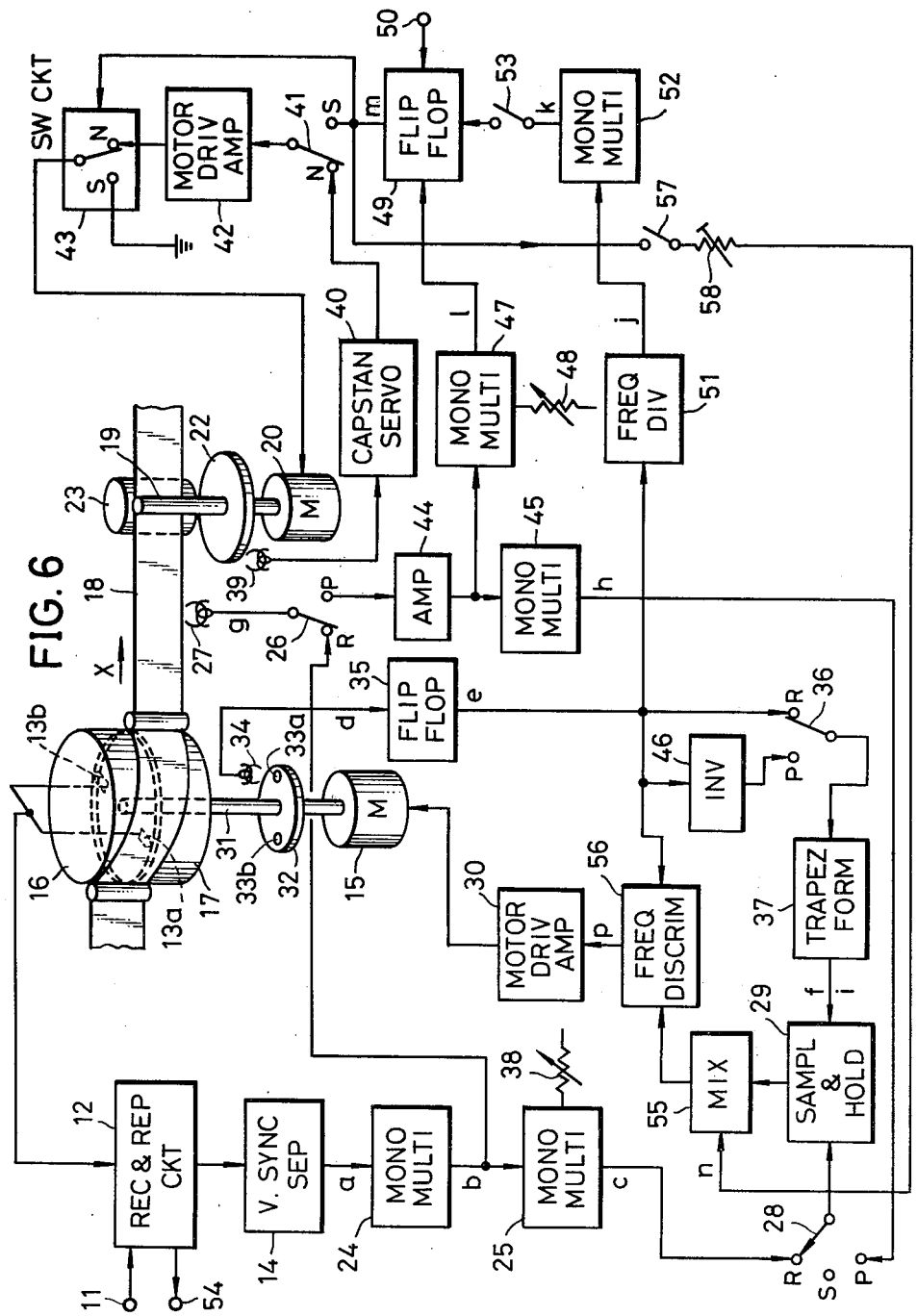

FIG. 7

SYSTEM FOR REPRODUCING VIDEO SIGNALS IN SLOW-MOTION MODE

BACKGROUND OF THE INVENTION

The present invention relates generally to a system for reproducing video signals from a magnetic tape for obtaining a slow-motion reproduction picture, and more particularly to a system for carrying out slow-motion reproduction so as to obtain a stable reproduced slow-motion picture without any accompanying noise therein and oscillation or wobbling thereof.

In a helical scanning type of video signal recording and reproducing apparatus, the video signals are successively recorded by one or more rotary heads on tracks oblique to the longitudinal line of the tape, such that, for example, one field is recorded per track. For slow motion reproduction of these recorded video signals, the tape is driven at a speed which is slower than a speed in the recording mode (or normal reproducing mode). Accordingly, in reproduction, the rotary heads repeatedly trace the respective tracks a plurality of times, whereby the reproduced picture has a slower motion than it would have if reproduced in a normal reproducing mode. It is in this way that slow-motion reproduction is achieved.

In the slow-motion reproducing mode, the rotary heads rotate at the same speed as in normal reproduction mode, while the tape is driven at a speed slower than that in a normal reproducing mode. As a result the inclination angle of the track traced by the rotary head on the tape in slow-motion reproduction mode differs from the inclination angle of the track in a recording mode (or normal reproduction mode) and this difference in inclination gives rise to tracking deviation.

In reproduction, when the rotary heads deviate from the signal tracks on the tape, a noise bar is generated in the reproduced picture. In the conventional slow-motion reproduction, the tape is continuously driven at a speed slower than the normal traveling speed at the time of a normal reproducing mode. The position at which the rotary heads deviate from the tracks undergoes successive shifts. For this reason, the position of the noise bar continuously shifts in the reproduced picture, (from top to bottom, for instance) and the noise therefore impairs the quality of the entire reproduced picture.

A DC motor is generally used for rotating the capstan so as to make it possible to drive the tape at different speeds. When the DC motor is to be rotated slowly for slow speed tape travel, the voltage applied to the DC motor is lowered to a potential which is less than the potential used at the time of normal rotation. However, when the voltage applied to the motor is lowered, the rotational torque of the motor decreases, and as a result the tape cannot be driven stably.

Moreover, when the DC motor is to be rotated at a slow speed, it is necessary to overcome starting friction by first applying to the motor a higher voltage, relative to the voltage required to obtain the desired low speed of rotation. Then, after the motor has started the voltage is reduced to the value required for slow speed rotation. However, the raising and lowering of the voltage applied to the DC motor to change the speed of rotation gives rise to hysteresis thus introducing a complex factor into rotation speed control and adjustment.

Accordingly, in order to overcome the above described difficulties, there have been previously proposed "TAPE DRIVING SYSTEM IN A RECORDING AND/OR REPRODUCING APPARATUS" in U.S. patent application Ser. No. 908,917, filed May 24, 1978, now U.S. Pat. No. 4,190,869, issued Feb. 26, 1980, and "SYSTEM FOR REPRODUCING A VIDEO SIGNAL IN A SLOW MOTION OR STILL PICTURE REPRODUCTION" in U.S. patent application Ser. No. 9077, filed Feb. 2, 1979, allowed on June 3, 1980, now U.S. Pat. No. 4,246,616 issued Jan. 20, 1981.

In these proposed systems, the tape makes intermittent shifts. Between shifts, when the tape is stopped, the same track is traced by the rotary heads a plurality of times and in this way slow-motion reproduction is carried out. Accordingly, it becomes possible to obtain the slow-motion reproduction picture with little accompanying noise. When the tape is being shifted, noise is generated for a small period of time. However, this noise can be pushed into an inconspicuous part of the reproduced picture so that the viewer can enjoy good quality slow-motion reproduction picture. Moreover, when averaging over a period of time which is long relative to frequency of applying a high voltage to start up the DC motor, the motor actually performing intermittent rotation can be considered as performing ordinary slow speed rotation for driving the tape. Accordingly, there is no decrease in the rotational torque of the motor, as there is in the prior system.

However, during the above mentioned slow-motion reproduction, the relative tracing speeds of the rotary video heads vary relative to the tape respectively at the time when the tape is stopped and at the time it is traveling are different. Although this relative tracing speed differs with the direction of tracing of the rotary video heads relative to the tape traveling direction, the relative tracing speed at the time of tape travel becomes lower by approximately 0.5 percent, as one example, in comparison with that at the time the tape is stopped. This variation in the relative tracing speed gives rise to variations in the periods of the horizontal synchronizing signal and the vertical synchronizing signal of the reproduced video signal. As a consequence, there has heretofore been the problem of intermittent oscillation of the reproduced image in the horizontal and vertical directions.

SUMMARY OF THE INVENTION

Accordingly, it is a general object of the present invention to provide a novel and useful system for slow-motion reproduction of video signals in which the above described problems have been overcome.

Another and specific object of the invention is to provide a system which carries out slow-motion reproduction by stopping the tape travel to reproduce the same track a plurality of times. Thereafter, the system intermittently advances and stops the tape, and thereafter repeats this operation. The rotation of the rotary video heads is controlled so that the tracing speeds of the video heads relative to the tape respectively at the time when the tape is traveling and at the time when it is stopped will be substantially the same as the corresponding speed when slow-motion reproduction is carried out. Since the above mentioned relative tracing speed is thus made constant for both the time of tape travel and the time of tape stoppage in the system of the invention, there is no variation of the periods of the reproduced synchronizing signals, whereby undesirable oscillation of the reproduced image does not occur.

Still another object of the invention is to provide a system which carries out the above described slow-motion reproduction as it controls the rotation of the rotary video heads at the time of intermittent advancing of the tape.

A further object of the invention is to provide a system which carries out the above described slow-motion reproduction while the rotation of the rotary video heads is so controlled that the frequencies (or periods) of the synchronizing signals of the reproduced video signal become constant at the time of intermittent advancing of the tape.

Further objects and features of the invention will be apparent from the following detailed description when read in conjunction with the accompanying drawings.

BRIEF DESCRIPTION OF THE DRAWINGS

In the drawings:

FIG. 1 is a block diagram of a first embodiment of the video signal slow-motion reproduction system according to the present invention;

FIGS. 2(A) through 2(I) are diagrams respectively indicating the waveforms of signals at various parts of the block diagram shown in FIG. 1;

FIG. 3 is a graph for a description of operation of a frequency discriminator;

FIG. 4 is a diagram indicating a track pattern at the time of recording;

FIGS. 5(A) through 5(H) are diagrams respectively indicating the waveforms of signals at various parts of the block diagram shown in FIG. 1 at the time of slow-motion reproduction according to the system of the present invention;

FIG. 6 is a block diagram showing a modification of the first embodiment shown in FIG. 1; and FIG. 7 is a block diagram of a second embodiment of the video signal slow-motion reproduction system of the present invention.

DETAILED DESCRIPTION OF THE INVENTION

Referring first to FIG. 1, a video signal to be recorded is introduced into the system through an input terminal 11 and is passed through a recording and reproducing circuit 12. The video signal is then supplied to a pair of rotary recording and reproducing video heads 13a and 13b and to a vertical synchronizing signal separation circuit 14. The video heads 13a and 13b have mutually opposite azimuths and mutually different track widths as described hereinafter and are mounted on diametrically opposite sides of a rotary drum 16. Rotation of a head motor 15 is transmitted by way of a pulley 61, a belt 62, and a flywheel 63 to the rotary drum 16, which is rotated at a rotational speed of 30 rps. A magnetic tape 18 is wrapped obliquely around the rotary drum 16 and a stationary drum 17 and is driven to travel in the arrow direction X by a pinch roller 23, a capstan 19 driven by a capstan motor 20 through a belt 21 and a flywheel 22. A video signal is recorded by the video heads 13a and 13b alternately along slant tracks on the tape 18, successively one field per track. The tracks are resultingly positioned contiguously to each other without gaps therebetween and obliquely relative to the longitudinal line of the tape.

On the other hand, a vertical synchronizing signal a (FIG. 2(A)) of 60 Hz which has been separated from the video signal in the vertical synchronizing signal separation circuit 14 is supplied to a monostable multivibrator 24, where its frequency is halved to 30 Hz. The resulting output signal b indicated in FIG. 2(B) is supplied to a monostable multivibrator 25 for adjusting the phase of the signal and, at the same time, by way of a switch 26 with its moving contact connected to a contact point R in a recording mode to a control head 27, by which the signal is recorded as a control signal on the lower edge of the tape 18. The resulting output signal c of the monostable multivibrator 25 is a waveform as indicated in FIG. 2(C) and is supplied, by way of a switch 28 with its moving contact connected to a contact R, to a sampling and holding circuit 29.

A pair of magnets 33a and 33b of opposite polarity are mounted on a rotating disc 32 fixed coaxially to a rotating shaft 31 which rotates together with the rotary drum 16. Together with rotation of the rotary drum 16, pulses d of positive polarity and negative polarity as indicated in FIG. 2(D) are obtained alternately by a pickup head 34 and are supplied to a flip-flop circuit 35. The resulting output e of the flip-flop circuit 35 of the waveform indicated in FIG. 2(E) is supplied, by way of a switch 36 with its moving contact connected to a contact R, to a trapezoidal wave forming circuit 37 and formed into a trapezoidal wave signal f as indicated in FIG. 2(F). The signal f is then supplied to the sampling and holding circuit 29.

The present embodiment is designed so that, when the output signal e of the flip-flop circuit 35 is at its low level, the video head 13a scans the tape, and when the output signal e is at its high level, the other video head 13b scans the tape.

In the sampling and holding circuit 29, the trapezoidal wave signal is sampled on its slope part responsive to the sampling pulse, and the slope part thus sampled is held. The resulting output signal of the sampling and holding circuit 29 is supplied through a mixer 55 to a frequency discriminator 56. The output signal of the flip-flop circuit 35 is also supplied to the frequency discriminator 56 as a frequency signal. Frequency (F)-voltage (V) conversion characteristic (FIG. 3) of the frequency discriminator 56 changes responsive to voltages of the signal from the mixer 55 so that, for one example, an inclination part thereof shifts as indicated by a full line and by broken line. For instance, when the inclination part shifts from the full line to the broken line, the output voltage changes from V1 to V2 for a predetermined frequency F1. The resulting output voltage of the frequency discriminator 56 is supplied through a motor driving amplifier 30 to the motor 15 thereby to control the rotation thereof. For instance, when the inclination characteristics of the frequency discriminator 56 changes from the full line to the broken line and the output voltage thereof thereby increases from V1 to V2, the rotational speed of the motor 15 increases. Accordingly, frequencies of signals picked up by the pickup head 34 and supplied from the flip-flop circuit 35 to the frequency discriminator 56 changes from F1 to F2, whereby the output voltage drops from V2 to V1. The rotational phase of the motor 15 is so controlled that the sampling position on the trapezoidal wave in the sampling and holding circuit 29 will become a specific position, for example, the middle position of the inclination part of the trapezoidal wave signal.

According to the above described controlling operation, the video heads 13a and 13b are rotated with their rotational phase maintaining a specific relationship with the phase of the vertical synchronizing signal of the input video signal. Adjustment of this phase relationship is made by adjusting the time constant of the monostable multivibrator 25 of which the time constant is adjusted by a variable resistor 38.

On the other hand, as the capstan 19 rotates, a pickup head 39 detects the rotation of the capstan 19, in cooperation with magnets (not shown) mounted on the flywheel 22. The signal thus detected is supplied to a capstan servo circuit 40, where an error is detected with respect to the reference speed. The resulting output control signal of the capstan servo circuit 40 is passed through a switch 41 with its moving contact connected to a contact point N, a motor driving amplifier 42, and a switch circuit 43 with its moving contact connected to a contact N, and is then supplied to the capstan motor 20 thereby to control the rotation thereof. Accordingly, the magnetic tape 18 is driven by the capstan 19 at a constant speed such that it is shifted by an amount corresponding to one track pitch during the period of time when the video heads 13a and 13b rotate over one-half of complete single rotation respectively.

At the time of normal reproduction, the moving contacts of the switches 26, 28, and 36 are respectively switched to their contact points P. The switch 41 and the switch circuit 43 are held with their moving contacts being connected to the contact points N, while switches 53 and 57 being held with their moving contact open. The control signals are reproduced by the control head 27, with a waveform as indicated in FIG. 2(G), and are supplied through the switch 26 and an amplifier 44 to a monostable multivibrator 45 having a delay time t1. The resulting output signal h of the monostable multivibrator 45 has a waveform as indicated in FIG. 2(H) and is supplied through the switch 28 to the sampling and holding circuit 29. On the other hand, the output signal e of the flip-flop circuit 35 is phase inverted by a phase inverter 46, and is then supplied through the switch 36 to the trapezoidal wave forming circuit 37. From the trapezoidal wave forming circuit 37, is derived a trapezoidal wave signal i as indicated in FIG. 2(I), which is in the polarity opposite to that of the trapezoidal wave signal f at the time of recording. The trapezoidal wave signal i is supplied to the sampling and holding circuit 29, where it is subjected to sampling by the above mentioned sampling signal h delayed by the delay time t1. Responsive to the output signal of the sampling and holding circuit 29, the motor 15 is controlled in its rotation.

The video signal picked up or reproduced by the video heads 13a and 13b passes the recording circuit 12, and is led out through a terminal 54.

Here, it is to be understood that, if the trapezoidal wave signal f is used as a signal to be sampled at the time of reproduction, or recording, the operation for advancing rotational phase encounters some limitations. For this reason, it is adapted so that, at the time of reproduction, the downwardly inclined part of the trapezoidal wave signal i which has been phase inverted is subjected to sampling by the rising part of the signal h delayed by the time t1.

Since the gaps of the video heads 13a and 13b respectively have mutually opposite azimuths, no signal is reproduced due to azimuth losses in the case where the video heads 13b and 13a respectively scan the tracks recorded by the video heads 13a and 13b (i.e., where so-called reverse tracking is carried out). Then, at the time of normal reproduction, the rotational phase of the motor 15 is so controlled that the sampling signal h which has been formed by the monostable multivibrator 45 responsive to the pulses of positive polarity in every two fields from the control head 27, as described above, will sample the middle part of the slope of the trapezoidal wave signal formed in correspondence with pulses of positive polarity from the control head 27. In this case, the pulses of positive polarity from the control head 27 are so set that they are generated in coincidence with the rotational position of, for example, the head 13a. For this reason, in a normal reproduction mode, the rotational phases of the video heads 13a and 13b are so controlled that these heads will always scan (positive tracking) the tracks recorded by these heads 13a and 13b respectively, and the above mentioned reverse tracking does not occur.

The video heads 13a and 13b, as shown in FIG. 4, respectively have gaps 70a and 70b inclined by an angle mutually in the opposite direction relative to the direction perpendicular to the scanning direction, that is, have azimuths of the angle α. These video heads 13a and 13b have respectively different track widths W1 and W2 and are so arranged that their respective end faces 71a and 71b are at the same reference face of the rotary drum 16. In the present embodiment of the invention, the width W1 is substantially equal to 1.5W2 through 1.6W2.

Video signal recorded tracks are formed on the tape 18 by the heads 13a and 13b in the following manner. When the head 13a rotating in the arrow direction Y scans the tape 18 traveling in the arrow direction X, a recorded track of the width W1 is formed obliquely to the longitudinal direction of the tape. Next, when the head 13b scans the tape 18 with an overlap of a width Wo over the track previously formed by the head 13a, a recorded track of the width W2 (=T) is formed. Here, the overlap width W0 is so set that W0=W1−T.

Then, since the recorded video signal has been frequency modulated, when a head scans and records a new signal with overlap over a track part which has been previously recorded, the previously recorded signal is erased by the bias effect of this new signal, and the new signal is recorded, as in known systems. Consequently, the signal recorded by the head 13a remains as a track t1 of the width T, while the signal recorded by the head 13b remains as a track t2 of the width T. Similarly, thereafter, tracks t3, t5, t7, . . . (wherein the subscripts of t are odd numbers) of width T are formed by the recording of the head 13a and the erasing effect of the head, and tracks t4, t6, t8, . . . (wherein the subscripts of t are even numbers) of width T are formed by the recording of the head 13b.

In this connection, it is to be understood that, in order to form the tracks in close contact in this manner, it is not absolutely necessary to use heads of different track widths as described above. It is possible to use heads of the same track width. In the practice of the system of the present invention, however, it is necessary that the track widths of the reproducing heads are different for the purpose of speed-change reproduction as described hereinafter, and, since recording also can be carried out by means of these reproducing heads, the above description has been set forth.

In this case, the tracks t1, t2, t3, . . . are in contiguous contact without gaps therebetween, whereby the tape utilization efficiency is high. Each track is recorded with a part of a video signal corresponding to substantially one field.

Here, the angle between the video heads 13a and 13b, and the magnets 33a and 33b, and the time constant of the monostable multivibrator 25 for adjusting phase are so adjusted that a vertical synchronizing signal is positioned near an end of the track. A control signal is recorded at the lower lateral edges of the tape 18 along a control track 72 in the longitudinal direction of the tape.

Next, an operation at the time of a still picture reproduction will now be described.

When, with the system in the state of normal reproducing mode, the manipulation button (not shown) for still picture reproduction mode is pushed, the switches 28 and 41 are changed over and connected to their contact points S. At the same time, trigger pulses are applied through a terminal 50 to a flip-flop circuit 49 to trigger the same. Thereafter, a control signal reproduced by the control head 27 and having a waveform is supplied by way of the switch 26 and the amplifier 44 to a monostable multivibrator 47. This monostable multivibrator 47, whose delay time constant is adjusted by a variable resistor 48, produces as output a signal of a waveform which falls in response to a control signal of positive polarity and rises after the elapse of a time t2 determined by the above mentioned time constant. The output of the flip-flop circuit 49 assumes a waveform which rises in response to a trigger pulse from the terminal 50 and falls in response to a rising up of the output of the monostable multivibrator 47.

The switch circuit 43 is switched to its contact point S in response to the fall of the output of the flip-flop circuit 49. As a consequence, the signal from the capstan servo circuit 40 is supplied to the motor 20 until the switch 41 is switched. After the switch 41 is switched and until the switch circuit 43 is switched, the signal from the flip-flop circuit 49 is supplied to the motor 20, which thus rotates to drive the magnetic tape 18. However, when the switch circuit 43 is switched, the motor 20 is grounded via the contact point S and immediately stops, and the magnetic tape stops traveling.

Thus, subsequent to the control manipulating for still picture reproduction mode, the magnetic tape 18 comes to a full stop at the end of a time t3 (equal to the sum of the above mentioned time t2 and the time of rotation of the motor 20 due to momentum) from the detection of the control signal of positive polarity. Accordingly, the variable resistor 48 is so adjusted, and the delay time t2 of the monostable multivibrator 47 is so adjusted that the distance from the detection of the control signal to the point at which the magnetic tape 18 comes to a full stop becomes the position where the heads scan the tracks in their most appropriate states.

Next, the operation of carrying out slow-motion reproduction through the application of the principle of this optimum still picture reproduction will be described.

When the control manipulation for slow-motion reproduction mode of operation is carried out, the switches 26 and 36 in the system illustrated in FIG. 1 are connected to their respective contact points P. The switches 28 and 41 are connected to their contact point S, while the switches 53 and 57 are closed. The switch 28 may be switched to its contact points S. Furthermore, the frequency dividing ratio of a frequency divider 51, which is supplied with the output of the flip-flop circuit 35, is set arbitrarily by a manual control (not shown) in accordance with the slow-motion of the desired slow-motion reproduction. For example, for $\frac{1}{2}$ slow-motion reproduction, the frequency dividing ratio is set at $\frac{1}{2}$.

The output signal of the flip-flop circuit 35 as indicated in FIG. 5(A) (which is the same as the signal e shown in FIG. 2(E) except that the time axis is compressed relative to that in FIG. 2(E)) is subjected to $\frac{1}{2}$ frequency division in the frequency divider 51, which thereby sends an output signal j of a waveform as indicated in FIG. 5(B) to a monostable multivibrator 52. This monostable multivibrator 52 thereby produces an output signal k of a waveform, as indicated in FIG. 5(C), which falls in response to a rise in the signal from the frequency divider 51 and rises after a specific time. This output signal is supplied through the switch 53 to the flip-flop circuit 49.

On the other hand, a control signal reproduced by the control head 27 as indicated in FIG. 5(D) is supplied through the amplifier 44 to the monostable multivibrator 47, which thereby supplies a signal l of a waveform as indicated in FIG. 5(E) to the flip-flop circuit 49. The flip-flop circuit 49 produces an output signal m which, as indicated in FIG. 5(F), rises in response to a rise in the signal k from the monostable multivibrator 52 and falls in response to a rise in the signal l from the monostable multivibrator 47.

During the high level period (2-field period) of the output signal m as indicated in FIG. 5(F) from the flip-flop circuit 49, the motor 20 rotates, and the magnetic tape 18 moves through a distance equal to twice the track pitch. Next, during the low level period (the succeeding 2-field period) of the signal m, the switch circuit 43 is changed over to its contact point S, and the motor 20 stops, whereby the magnetic tape 18 is stopped. Similarly, thereafter, the cyclic operation wherein the magnetic tape 18 moves by twice the track pitch and stops is repeated every 2-field period.

Then, when the average speed of the magnetic tape 18 at the time of its movement is the normal speed, a normal reproduced picture is obtained in a 2-field period, and a still picture is obtained in the succeeding 2-field period. Accordingly, as an overall average result, a slow-motion reproduced picture of $\frac{1}{2}$ speed is obtained. In this operation, at every instance of still picture reproduction every other 2-field period, the magnetic tape 18 stops at a position of minimal occurrence of noise and beats which is offset by the predetermined distance from the position at the time of the control signal reproduction, which is similar to the aforedescribed still picture reproduction operation. For this reason, noise is not generated in the normal reproduction occurring every other 2-field period. There is almost no generation of noise in the still-picture reproduction occurring during every other 2-field periods. Therefore, a slow-motion reproduced picture of good image quality is obtained without defects such as noise and beats.

In this connection, the frequency division of the frequency divider 51 is set in accordance with the slow-motion ratio. The still picture reproduction period is thereby set, whereby a slow-motion reproduction of the desired speed is achieved. For example, for $\frac{1}{3}$-speed slow-motion reproduction, the frequency division ratio of the frequency divider 51 is set at $\frac{1}{3}$. Then, the signals indicated in FIGS. 5(B) and 5(C) become signals of 6-field period, and the signal indicated in FIG. 5(F) becomes one of high level during a 2-field period and one of low level during a 4-field period. As a result, normal reproduction is carried out during a 2-field period, and still picture reproduction is carried out during a 4-field period, whereby, as a whole, a slow-motion reproduction of ½ speed is accomplished.

In the case shown in FIG. 4, the tape 18 travels in the arrow direction X, and the video heads 13a and 13b trace in the arrow direction Y. The relative tracing speed of the video heads relative to the stopped tape is higher than the relative tracing speed of the video heads relative to the traveling tape. As a consequence, as mentioned hereinbefore, the period of the synchronizing signals within the reproduced video signal at the time when the tape is traveling and that at the time when the tape is stopped differ, and the problem of the oscillation or wobbling of the reproduced picture image arises. One measure for causing the relative tracing speed to be constant irrespective of whether the tape is stopped or traveling is to increase the relative tracing speed at the time of tape travel.

Accordingly, in the present embodiment of the system of the present invention, this problem is solved in the manner described below.

The output signal m of the flip-flop circuit 49 is supplied through a switch 57, which is closed, and a variable resistor 58 to a differentiation circuit 59, where it is differentiated. The direct-current component of the signal passed through the variable resistor 58 passes through a resistor 60 and is added to the output of the differentiation circuit 59. As a result, a voltage signal n of the waveform indicated in FIG. 5(G) is supplied to a mixer 55. At this time, the sampling and holding circuit 29 is not supplied with a sampling signal since the movable contact of the switch 28 is connected to its contact point S. For this reason, a sampling output is not produced, and the sampling and holding circuit 29 produces a constant voltage. Therefore, the constant voltage is superimposed on the above mentioned signal n in the mixer 55, and the resulting signal is applied to a frequency discriminator 56.

Accordingly, a voltage p of the waveform indicated in FIG. 5(H), in which, in every two-field period, a standard voltage Vs and a higher voltage alternately appear, is produced as output from the frequency discriminator 56 and is applied through the motor driving amplifier 30 to the motor 15. The standard voltage Vs is a voltage for rotating the motor at the specific rotational speed (30 rps) at the time of normal reproduction.

Thus, in the case of this ½ slow-motion, a voltage higher than the standard voltage Vs is applied to the motor 15, which is rotated at a rotational speed which is higher than the speed at the time of normal rotation (30 rps) during the two-field period in which the motor 20 is rotated and the tape 18 travels. During the succeeding two-field period in which the travel of the tape 18 is stopped, the motor 15 is supplied with the standard voltage Vs and is rotated at the normal speed. As a result, the rotational speed of the motor 20 during the period of tape travel is caused to be higher than the speed during the period in which the tape travel is stopped. The relative tracing speed of the video heads 13a and 13b relative to the tape 18 is high.

Then, when the resistance value of the variable resistor 58 is varied, the voltage value of the voltage signal n is varied. Accordingly, in the process step of adjustment after the fabrication and assembly of the reproducing apparatus, the resistance value of the variable resistor 58 is so adjusted that the relative tracing speed of the video heads relative to the tape at the time of tape travel will be equal to that at the time when the tape travel is stopped.

Thus, although the relative tracing speed of the video heads relative to the tape during slow-motion reproduction is made approximately 0.5 percent, for example, higher than that at the time normal reproduction, the relative tracing speed is always constant irrespective of whether the tape is undergoing intermittent travel or is stopped. Therefore, the periods of the horizontal and vertical synchronizing signals of the reproduced video signal are continually constant, and intermittent oscillation or wobbling of the reproduced picture image does not occur.

The relative tracing speed during slow-motion reproduction can become the same as the speed during normal reproduction by thus setting the standard voltage Vs at a slightly lower value.

The present embodiment of the invention employs belt-drive systems, wherein rotational driving powers are transmitted respectively from the motors 15 and 20 through belts to the rotary drum 16 provided with the video heads 13a and 13b and to the capstan 19. However, because the rotational speed of the video heads 13a and 13b is higher than that of the capstan 19 and, in addition, because of differences such as that between the rotation transmitting characteristics of the driving systems including the belts 62 and 21 and the flywheels 63 and 22, the characteristic at the starting of rotation of the video heads 13a and 13b differs from the characteristic at the starting of travel of the tape 18 due to the capstan 19. It is necessary to apply to the motor 15 at the start of its rotation a voltage of a waveform of greater rising than that of the voltage applied to the motor 20 at the start of its rotation.

In the present embodiment of the invention, a voltage of a differentiated waveform of a great rising as stated above is formed by the differentiation circuit 59. The driving voltage p obtained in accordance with this steep-rising voltage is applied to the motor 15, which therefore is started by a steeply rising voltage. For this reason, excellent reproduction is carried out by the video heads 13a and 13b during the travel of the tape 18 from the start of the tape travel despite the use of belt-drive systems.

Instead of feeding the above mentioned signal voltage n as input to the mixer 55, it may be added to the output of the frequency discriminator 56. However, the circuit arrangement of the present embodiment of the invention is more desirable from the viewpoint of rotation control performance.

An example of modification of the above described embodiment of the invention will now be described in conjunction with FIG. 6. In FIG. 6, those parts which are the same as corresponding parts in FIG. 1 are designated by the same reference numerals and characters. Description of such parts will be omitted.

This modification illustrates a case where the system of the present invention is applied to a reproducing apparatus of the direct-drive type.

The rotary drum 16 is driven in rotation directly by the motor 15, and the capstan 19 is driven in rotation directly by the motor 20 without the use of drive transmission belts. In the reproducting apparatus of this mechanical organization, since the rotating parts are coupled directly to respective motors, the problems encountered in belt-drive systems, as in the above described embodiment of the invention, do not arise.

In the present modification, therefore, since there is no necessity of considering the problems arising at the time of the start of rotation of the video heads, the differentiation circuit 59 needed in the above described embodiment of the invention is not provided. The output signal m of the flip-flop circuit 49 is fed through the variable resistor 58, where its voltage value is adjusted, and is then supplied directly to the mixer 55.

The rotational speed of the motor 15 when the tape is traveling during slow-motion reproduction is made higher than that when the tape travel is stopped by a voltage in accordance with the output of the flip-flop circuit 49. Thus, the relative tracing speed of the video heads relative to the tape is continually maintained constant similar to the above described embodiment of the invention.

In a case where the scanning direction of the video heads with respect to the tape traveling direction is selectively reverse to the above described direction, the relative tracing speed of the video heads to the tape when it is traveling becomes greater than the speed when the tape is being stopped. Accordingly, in this case, the polarity of the rotation control voltage supplied from the flip-flop circuit 49 to the mixer 55 is reversed.

Figure 7:
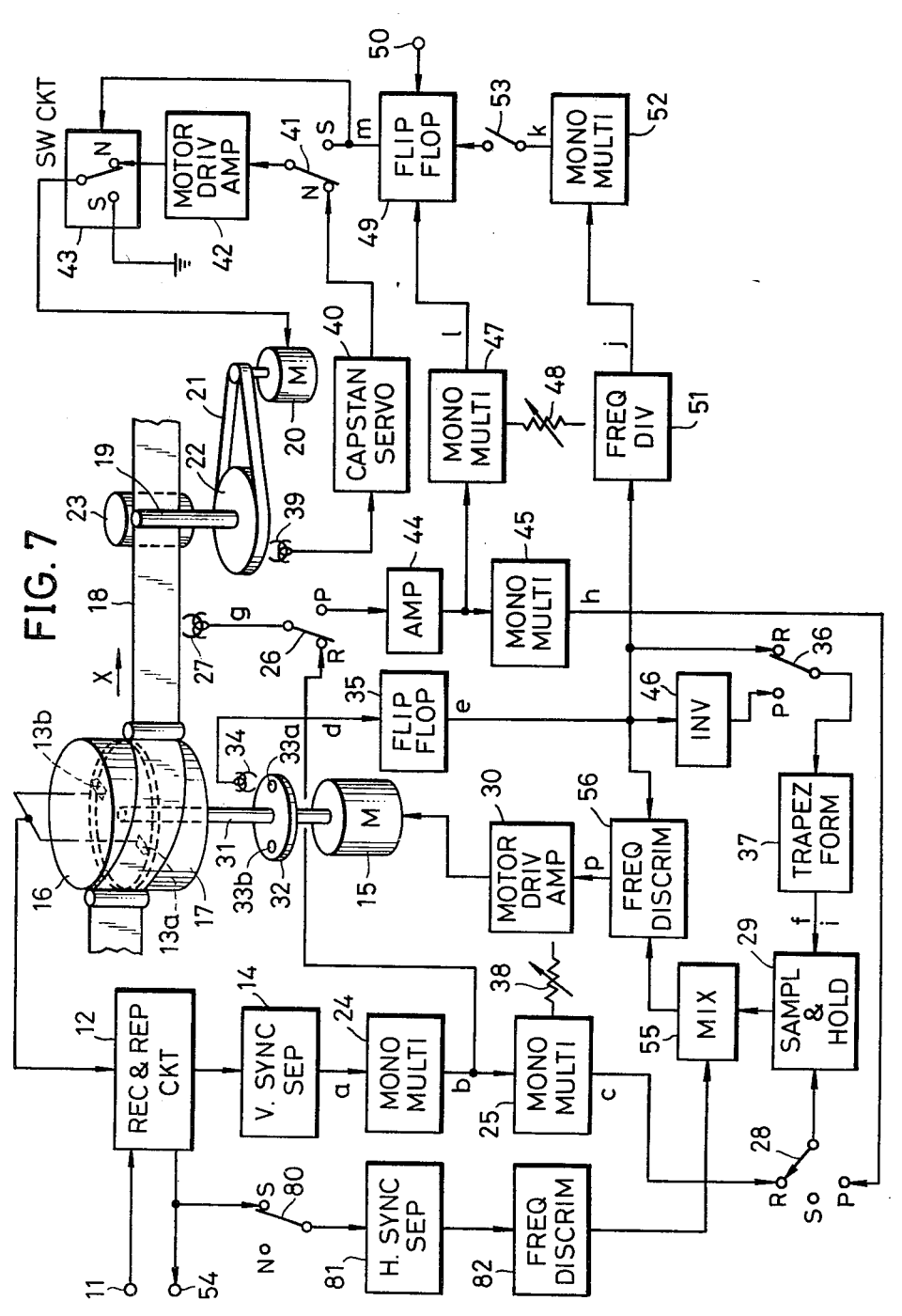

The second embodiment of the invention will now be described with reference to FIG. 7. In FIG. 7, those parts which are the same as corresponding parts in FIG. 1 are designated by like reference numerals and characters. Description of such parts will be omitted.

A reproduced video signal from the recording and reproducing circuit 12 is led out through the output terminal 54 and, at the same time, is applied to a contact point S of a switch 80. The movable contact of the switch 80 is in contact with a contact point N at the time of normal reproduction and moved to the contact point S at the time of slow-motion reproduction. Accordingly, at the time of slow-motion reproduction, the reproduced video signal passes through the switch 80 and is supplied to a horizontal synchronizing signal separator 81, where the horizontal synchronizing signal is separated.

The separated horizontal synchronizing signal is fed to a frequency discriminator 82, where it is frequency detected (or phase detected). The resulting output signal is supplied to the mixer 55, where it is superimposed on a constant voltage from the sampling and holding circuit 29.

Accordingly, the rotation of the motor 15 is controlled so that the period of horizontal synchronizing signal in the video signal reproduced by the video heads 13a and 13b cancels any fluctuation involved therein, to be a constant period.

The present embodiment has a higher transient response, thereby being effectively applied to a direct drive system in which the rotary drum 16 is driven directly by the motor 15. Since, the control system is a closed loop, this system is free from any influences such as temperature fluctuation and change caused by an elapsing of time, whereby stable rotation control is assured all the time.

Further, this invention is not limited to these embodiments. Variations and modifications may be made without departing from the scope of the invention.

What is claimed is:

1. A system for reproducing a video signal in a slow-motion reproduction comprising:

reproducing means including at least one rotary head for tracing a tape on which video signals have been recorded along parallel tracks extending obliquely to the longitudinal line of the tape to reproduce the recorded video signals from said tracks;

head driving means including a head motor for driving the rotary head;

capstan means for moving said tape;

capstan driving means including a capstan motor for driving said capstan means;

pulse generating means for generating recurring pulse voltages having a frequency which depends upon a slow-motion ratio;

energizing means responsive to the recurring pulse voltages for energizing said capstan motor to move said tape during the high level of the recurring pulse voltages by a distance equal to two pitches of the parallel tracks at a speed substantially equal to a tape speed in a normal reproduction and to stop said tape during the low level of the recurring pulse voltages; and control means for controlling the rotation of the rotary head so that the relative tracing speed of the rotary head relative to the tape is substantially the same both at the time of intermittent tape travel and at the time of intermittent tape stoppage in a slow-motion mode, said control means comprising means for producing a constant voltage, means responsive to the recurring pulse voltages for producing control pulse voltages having the same frequency as the recurring pulse voltages, means for superimposing the control pulse voltages on the constant voltage, and means for applying the output voltage of said superimposing means to the head motor.

2. A video signal slow-motion reproducing system as claimed in claim 1 in which: said head driving means is of a construction wherein said rotary head is rotated by said head motor by way of a belt; and said means for producing control pulse voltages comprises a variable resistor for adjusting a voltage value of the recurring pulse voltages, a differentiation circuit for differentiating said recurring pulse voltages, and a circuit bypassing said differentiation circuit to pass a direct current component of said recurring pulse voltages.

3. A video signal slow-motion reproducing system as claimed in claim 1 in which: said head driving means is of a construction wherein said head motor directly rotates said rotary head, and said means for producing control pulse voltages comprises a variable resistor for adjusting a voltage value of said recurring pulse voltages.

4. A video signal slow-motion reproducing system as claimed in claim 1 in which: said rotary head traces said tape obliquely in a direction, depending on the tape traveling direction, so that the relative tracing speed at the time when said tape is stopped is higher than the speed at the time when said tape is traveling; and said means for producing control pulse voltages produces control pulse voltages for speeding up rotation of said head motor at the time when said tape is traveling.

5. A system for reproducing a video signal in a slow-motion reproduction comprising:

reproducing means including at least one rotary head for tracing a tape on which video signals have been recorded along parallel tracks extending obliquely to the longitudinal line of the tape to reproduce the recorded video signal from said tracks;

head driving means including a head motor for driving the rotary head;

capstan means for moving said tape;

capstan driving means including a capstan motor for driving said capstan means;

pulse generating means for generating recurring pulse voltages having a frequency which depends upon a slow-motion ratio;

energizing means responsive to the recurring pulse voltages for energizing said capstan motor to move said tape during the high level of the recurring pulse voltages by a distance equal to two pitches of the parallel tracks at a speed substantially equal to a tape speed in a normal reproduction and to stop said tape during the low level of the recording pulse voltages; and control means for controlling the rotation of the rotary head so that the relative tracing speed of the rotary head relative to the tape travel is substantially the same both at the time of intermittent tape travel and at the time of intermittent tape stoppage in a slow-motion mode, said control means comprising means for producing a constant voltage, means for separating a horizontal synchronizing signal from the video signal reproduced by said rotary head, means for frequency-discriminating the separated horizontal synchronizing signal to produce control pulse voltages, means for superimposing the control pulse voltages on the constant voltage, and means for applying the output voltage of said superimposing means to the head motor.

* * * * *